May 21, 1946.   H. J. ZIMMERMANN   2,400,586
RADIAL PRESSURE CLUTCH
Filed June 5, 1944   3 Sheets-Sheet 3
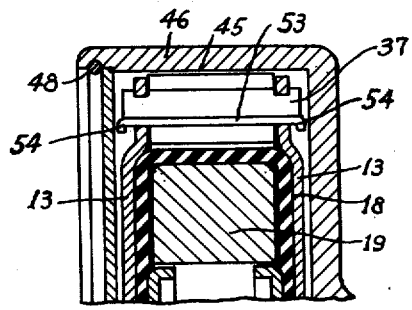
Fig. 12
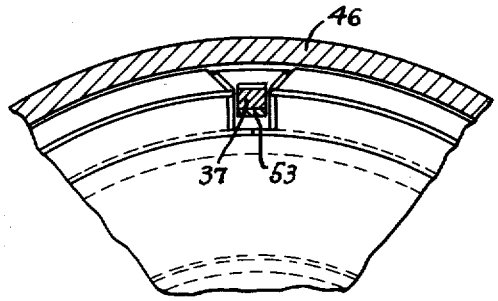
Fig. 13
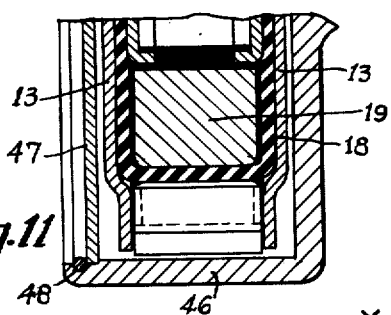
Fig. 11
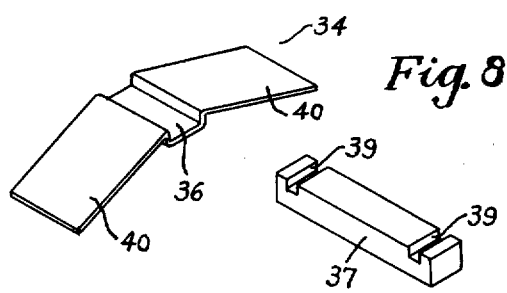
Fig. 8
Fig. 9
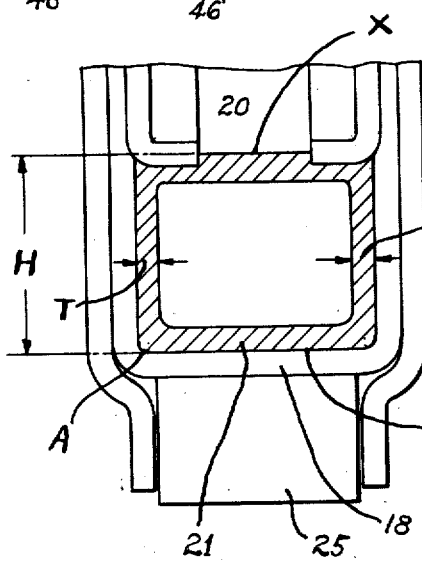
Fig. 14
Inventor
Hans J. Zimmermann
By Frease and Bishop
Attorneys Patented May 21, 1946

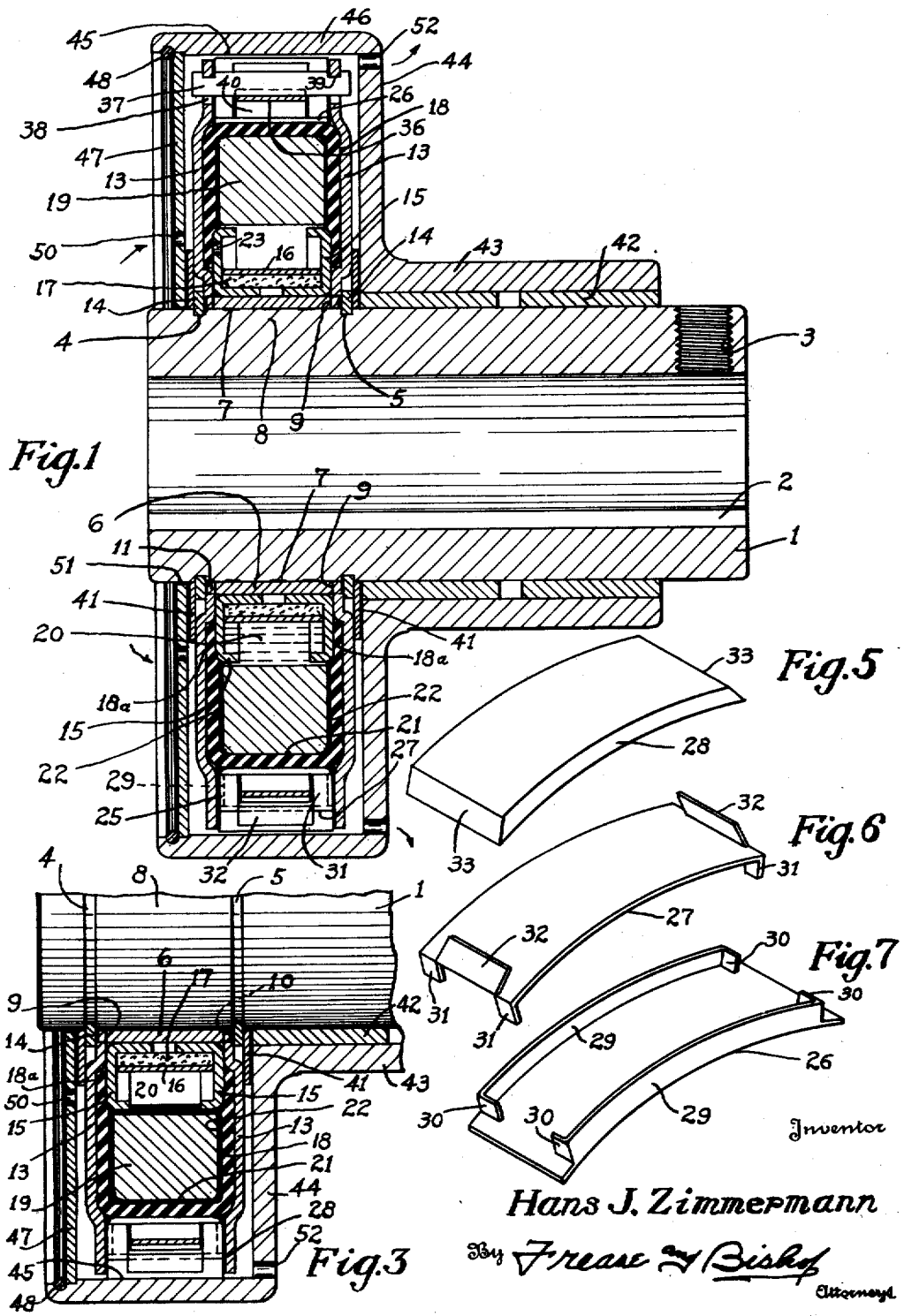

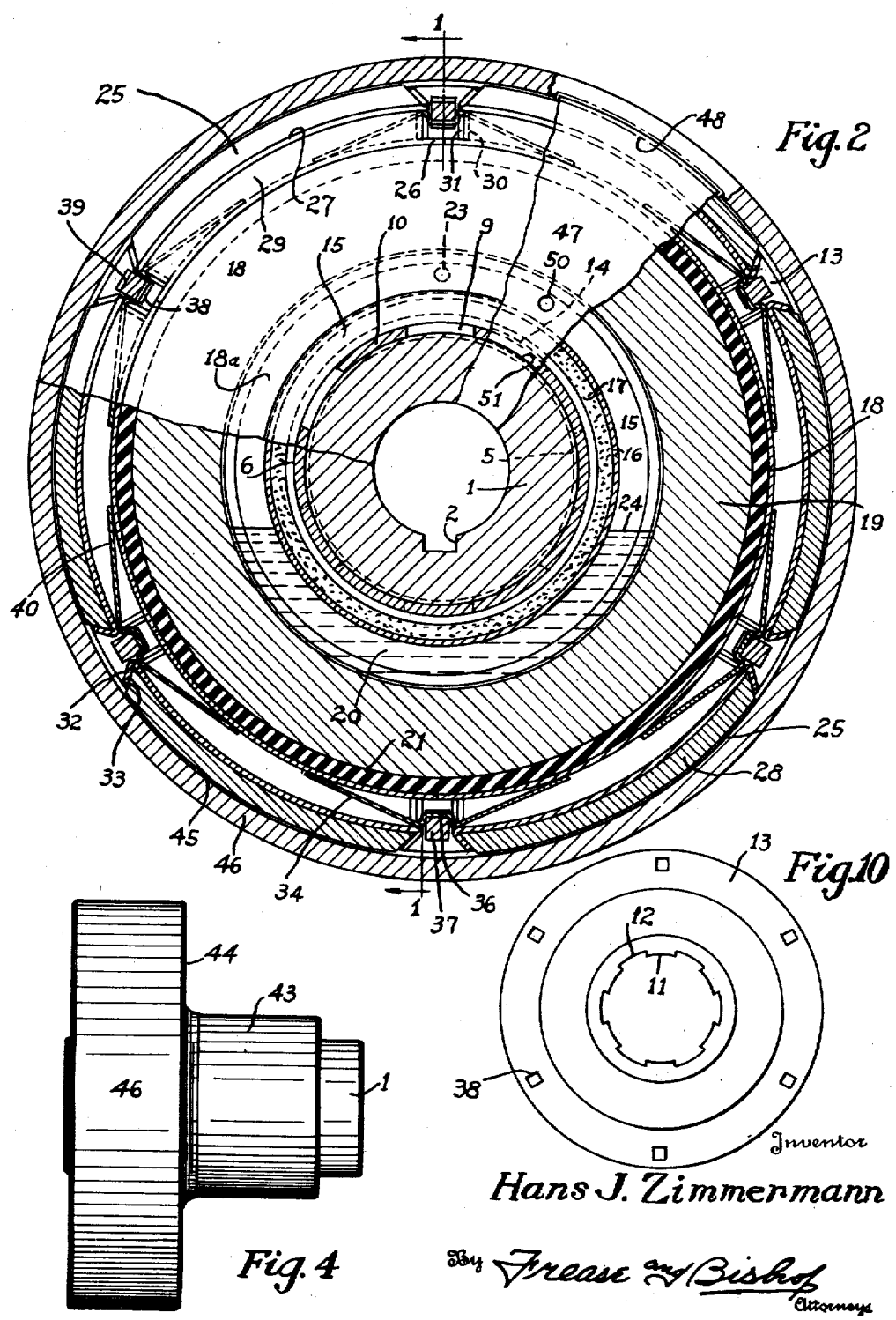

2,400,586

UNITED STATES PATENT OFFICE 2,400,586

RADIAL PRESSURE CLUTCH

Hans J. Zimmermann, Canton, Ohio, assignor to Mercury Clutch Corporation, Canton, Ohio, a corporation of Ohio Application June 5, 1944, Serial No. 538,869

20 Claims. (Cl. 192—105)

The invention relates to clutches and more particularly to a mercury actuated centrifugal clutch in which radially movable members are forced into driving engagement with a driven member by the pressure of mercury contained in an expansible driving member chamber automatically upon rotation of the driving member.

There are examples in the prior art of fluid pressure clutches in which a tubular rubber bag is used for effecting a driving connection between a driving member and a driven member. In one of these prior devices, the tube is inflated with fluid pumped into the tube through a valve by a pump carried by the clutch. In another of these prior devices, a large body of fluid contained within the tube acts centrifugally to establish driving engagement with floating friction discs and loosely mounted shoes.

In each of these constructions, difficulties are encountered in introducing the fluid into and sealing the same within the tubular rubber bag; in developing sufficient fluid pressure to transmit heavy loads in a small sized device; and in preventing injury to or destruction of the tubular bag incident to inertia or fluid pressure developed during operation.

Moreover, where a pump and valves are used for inflating the tube, the device of necessity has a relatively large size and weight and includes numerous parts in order to build and house the pump and valves as self-contained parts of the device.

Clutches of the liquid type in which a body of liquid, preferably mercury, is used for effecting a driving connection between a driving member and a member to be driven are shown in the Kohl Patents Nos. 1,972,741, 2,258,157, 2,283,267 and 2,307,797. The construction and operation of these Kohl-type mercury clutches overcomes some of the difficulties present in the construction and operation of prior art tubular rubber bag-type fluid pressure clutches. However, some disadvantages are present in the Kohl-type clutch in that it is difficult to seal and confine the mercury, to repair or replace the friction shoes, to rapidly dissipate heat during operation, to carry away dust from wear of the friction elements, and to provide for proper lubrication of the bearings which may be associated with the clutch.

Moreover, in the Kohl-type clutch, the length of the clutch torque arm is only a fraction of the clutch diameter and the weight of the friction shoes reduces the pressure available or effective at the friction engaging surfaces.

Accordingly, it is a general object of the present invention to provide a liquid actuated centrifugal clutch utilizing the advantages of mercury actuation and an expansible pressure chamber, while avoiding the difficulties and disadvantages of prior art devices which include such elements.

Also it is an object of the present invention to provide a radial mercury actuated centrifugal clutch in which the mercury is confined in a liquid tight compartment without rotary seals for preventing loss or contamination of the mercury.

Moreover, it is an object of the present invention to provide a radial mercury actuated centrifugal clutch in which the friction engaging surfaces are in a readily accessible chamber separate from the mercury compartment and in which only a small or limited amount of mercury is used.

It is a further object of the present invention to provide a radial mercury actuated centrifugal clutch in which the friction shoes are readily accessible for repair or renewal by any mechanic.

Also it is the object of the present invention to provide a radial mercury actuated centrifugal clutch with means for eliminating dust formed by wear of the friction elements, from the housing in which the friction elements are located.

Furthermore it is an object of the present invention to provide a radial mercury actuated centrifugal clutch in which the weight of the friction shoes supplements the mercury pressure in establishing driving engagement.

Also it is an object of the present invention to provide a radial mercury actuated centrifugal clutch in which the clutch torque arm has a maximum length of substantially the radius of the outermost clutch housing.

Also it is an object of the present invention to provide a radial mercury actuated centrifugal clutch in which heat incident to operation is produced at the periphery of the outermost clutch housing where it may be dissipated most readily.

In addition, it is an object of the present invention to provide a radial mercury actuated centrifugal clutch in which bearings incorporated in the clutch may be made of any suitable material and lubricated without contaminating the mercury with lubricant.

Furthermore it is an object of the present invention to provide a radial mercury actuated centrifugal clutch in which the mercury is contained in a compartment formed in part by an expansible, preferably rubber gland, and in which the rubber gland is not subject to injury due to mercury pressure or to the inertia of the gland or mercury upon rotation thereof.

Also it is an object of the present invention to provide a radial mercury actuated centrifugal clutch having an expansible compartment in which the mercury is confined and into which the mercury may be introduced during assembly without special fittings or seals.

Moreover it is an object of the present invention to provide a radial mercury actuated centrifugal clutch which may be assembled by the simplest of operations without special machinery.

Finally, it is an object of the present invention to provide a radial mercury actuated centrifugal clutch in which only a small amount of mercury is required for producing comparatively great pressures in a small-sized device which is extremely simple in construction, durable and effective in operation, and relatively inexpensive to manufacture.

These and other objects and advantages apparent to those skilled in the art from the following description and claims may be obtained, the stated results achieved, and the described difficulties overcome, by the devices, constructions, arrangements, combinations, sub-combinations, parts, and elements which comprise the present invention, the nature of which is set forth in the following general statement, preferred embodiments of which—illustrative of the best mode in which the applicant has contemplated applying the principle—are set forth in the following description and shown in the drawings, and which are particularly and distinctly pointed out and set forth in the appended claims forming part hereof.

The nature of the improvements in radial pressure clutches of the present invention may be stated in general terms as including, in a radial mercury actuated centrifugal clutch, a hollow drum-like driven member having a clutch friction surface on its inner periphery, the driven member preferably being rotatably journalled on a driving member; the driving member including a plurality of disc-like members mounted on and rotatable with the driving member, an annular rubber gland, U-shaped in cross section, with the legs of the U clamped and compressed between certain of said disc members forming a closed compartment, filler means associated with said compartment dividing the compartment into two communicating annular chambers, one of said chambers being located radially inward of the filler means and having a relatively fixed volume, and the other chamber being located radially outward of the filler means and being expansible by radial expansion of portions of the legs and the base of the U-gland, means for sealing a quantity of mercury within said compartment in liquid tight manner, said means being constructed and arranged to permit air to escape out of or into said compartment, a body of mercury normally in the inner chamber when the clutch is at rest and adapted upon rotation of the driving member to be thrown outward by centrifugal force beyond the filler means and into the outer expansion chamber to expand the gland; a plurality of arcuate friction shoes mounted upon and rotatable with the driving member, said shoes being radially movable relative to the driving member and being arranged about the outer periphery of the U-shape rubber gland for being pressed outwardly into contact with the clutch friction surface of the driven member by the pressure of the mercury within the expansible chamber, preferably spring means normally urging said friction shoes radially inward of the driving member when the clutch is at rest, means transmitting driving torque from the driving member to said shoes, and means for ventilating the interior of the housing formed by the driven member drum.

By way of example, preferred embodiments of the improved clutch are illustrated in the accompanying drawings forming part hereof, wherein:

Figure 1 is an enlarged vertical section taken on the line 1—1 of Fig. 2 and showing a clutch incorporating the improvements of the present invention with the clutch parts in the position that they assume when the clutch is at rest;

Fig. 2 is an end view of the clutch shown in Fig. 1 with parts broken away and in section on several planes;

Fig. 3 is a fragmentary view similar to a portion of Fig. 1 but illustrating the parts in the position that they assume when the clutch is running and engaged;

Fig. 4 is a side elevation of the clutch illustrated in Figs. 1, 2 and 3;

Fig. 5 is a perspective view of a clutch friction member;

Fig. 6 is a perspective view of a friction shoe outer support;

Fig. 7 is a perspective view of a friction shoe inner support;

Fig. 8 is a perspective view of one of the friction shoe springs;

Fig. 9 is a perspective view of one of the friction shoe driver bars;

Fig. 10 is a side elevation of one of the driving member assembly discs;

Fig. 11 is a view similar to Fig. 3 illustrating the clutch in motion but before engagement and showing the position of the mercury before it has entered and expanded the outer chamber of the expansible compartment;

Fig. 12 is a view similar to a portion of Fig. 1 showing a modified form of construction;

Fig. 13 is a view similar to a portion of Fig. 2 showing the modified form of construction of Fig. 12; and Fig. 14 is a diagrammatic view illustrating the principle of operation of the improved clutch.

Similar numerals refer to similar parts throughout the drawings.

The driving member of the improved clutch preferably includes a driving sleeve 1 which may be secured to a driving shaft not shown, by a key engaged in a keyway 2, and by a set screw threaded into threaded hole 3, or both. The driving sleeve 1 is preferably provided with two annular grooves 4 and 5 between which the tubular outer sleeve 6 extends. The outer sleeve 6 may be spot welded at 7 at a plurality of places to the portion 8 of the driving sleeve 1. Each end of the outer sleeve 6 is preferably formed with alternate notches 9 and lugs 10 (Fig. 2) which interengage and match with alternate lugs 11 and notches 12 (Fig. 10) formed around the periphery of the central aperture in each of driving member discs 13, whereby the discs 13 are rotated by the driving sleeve 1. A split snap ring 14 is seated in each groove 4 and 5 to hold the discs 13 assembled on driving sleeve 1.

Two double flanged clamping rings 15, with a spacer sleeve 16 surround the outer sleeve 6 between the discs 13; and a preferably felt sleeve 17 is interposed beneath the spacer sleeve 16 and the inner flange of each clamping ring 15 for a purpose to be later described.

An annular rubber gland 18, U-shaped in cross section, has the inner ends 18a of the legs of the U clamped between adjacent discs 13 and clamping rings 15. The relative positions of the discs 13 and clamping rings 15 so that they clamp and compress the portion 18a of the gland 18 are determined and maintained by the snap rings 14 which prevent spreading of the discs 13, and by the spacer sleeve 16 which holds the clamping rings 15 in separated position. Thus the rubber gland 18, the clamping rings 15, the spacer sleeve 16 and the felt ring 17 form a closed annular liquid-tight mercury compartment. An annular filler ring 19 is located within the compartment preventing collapse of the base and legs of the U of the rubber gland 18 and dividing the compartment into two chambers. One of these chambers 20 is located radially inward of the filler ring 19 and has a relatively fixed volume. The other chamber 21 has a relatively changeable volume. The chamber 21 collapses to almost nothing when the clutch is at rest but enlarges by expansion of the rubber gland 18 when the clutch is rotating as best shown in Fig. 3. The chamber 21 is located radially outward of the filler ring 19.

As shown in the drawings, there is a slight clearance passage 22 between each face of the filler ring 19 and the inner surface of the U legs of the rubber gland 18 to form communication within the driving member compartment between the inner chamber 20 and the outer chamber 21. The communication 22 between the chambers 20 and 21 may be formed in various ways, as by grooving the outer surface of the filler ring 19, or by forming radial holes through the filler ring 19. The size of the clearance or the size and number of such grooves or holes govern the rate at which mercury contained within the driving member compartment is transferred from the inner chamber 20 to the outer chamber 21, or vice versa.

One of the clamping rings 15 is preferably provided with a hole 23 under the portion of the rubber gland leg 18a that is clamped and compressed between the ring 15 and a disc 13 so that in assembling the parts, the leg 18a of the gland 18 over hole 23 may be raised for introducing the desired amount of mercury into the driving member compartment, after which the adjacent disc 13 and snap ring 14 are assembled on the driving sleeve 1. The mercury thus introduced into the driving member compartment is normally contained within the inner chamber 20 when the clutch is at rest, as indicated by the liquid level 24 in Fig. 2.

A plurality of friction shoes generally indicated at 25 are arranged circumferentially around the rubber gland 18 in a channel formed between the outer edges of the discs 13. Each friction shoe 25 preferably includes an inner arcuate support member 26 shown on Fig. 7, an outer arcuate support member 27 shown on Fig. 6, and an arcuate friction member 28 shown on Fig. 5.

The inner member 26 preferably is provided with upstanding edge flanges 29 terminating at each end in inturned lugs 30. The outer member 27 is provided at each end with spaced downturned lugs 31 and an upturned finger 32. The member 27 is assembled to the member 26 by sliding the member 27 laterally over the member 26 so that the downturned lugs 31 of the member 27 engage over the inturned lugs 30 of the member 26, thereby forming a hollow arcuate box-like support. The ends 33 of the friction members 28 are preferably tapered so that the member 28 may be slid laterally onto the outer support member 27 with the tapered ends 33 engaged by the fingers 32.

The friction shoes 25 are assembled on the driving member discs 13 by inserting them into the channel formed between the outer edges of the discs, with a flat leaf spring generally indicated at 34 spanning each space between adjacent shoes 25. Each flat leaf spring 34 is provided with a central recess 36 which engages under and around a driver bar 37 inserted through holes 38 formed adjacent the outer edge of each disc 13. Grooves 39 located near each end of each driver bar 37 engage and interlock with the discs 13 as best shown at the upper portion of Fig. 1.

The wings 40 of each spring 34 extend through the spaces between spaced over-lapped support lugs 30 and 31, into the hollow interior of the box formed by the support members 26 and 27. The springs 34, driver bars 37 and friction shoes 25 when assembled on the driving member are arranged so that the springs 34 normally react to press the friction shoes 25 radially inward against the rubber gland 18. The shoes 25 are free to move radially outward when subjected to sufficient pressure to overcome the tension of the springs 34. However, the shoes 25 are at all times positively driven by the driver bars 37 to rotate with the driving member.

A plurality of thrust bearing washers 41 are mounted on the driving sleeve 1 adjacent each split locking ring 14, and a bearing sleeve 42 preferably surrounds the driving sleeve 1 at one side of one of the discs 13 for journaling the hub 43 of the driven member housing 44 having a clutch friction surface 45 on the inner periphery of its outer drum-like wall 46. A cover plate 47 is assembled to the driven member 44 by a split snap ring 48. The driven member 44 and its cover plate 47 thus form a housing around the parts of the driving member mounted on driving sleeve 1.

A series of holes 50 are preferably provided near the inner central aperture 51 of the cover plate 47 and another series of holes 52 are provided in driven member 44 adjacent the outer drum-like wall 46 for inducing the passage of currents of ventilating air through the driven member housing and around the brake shoes 25, to assist in cooling the clutch and to carry away dust formed by wear of the friction members 28, as indicated by the arrows applied to Fig. 1.

The construction of the clutch is very simple because each of its constituent elements may be readily fabricated by the simplest operations. Thus the driven member 44 may be either a casting or a stamping which may be finished by simple machining or grinding operations on the inner and outer surfaces of the hub portion 43 and the cylindrical friction surface 45 on the interior of the outer drum-like wall 46. The driving sleeve 1 has a uniform outer diameter, excepting for the grooves 4 and 5 and therefore may be machined and ground by the simplest of operations. Each of the parts 6, 13, 15, 16, 26, 27 and 47 are simple stampings or tube parts readily formed of sheet metal. The leaf springs 34, and snap rings 14 and 48 and driver bars 37 are of simple design. The thrust washers 41 and bearing sleeve 42 may be formed of any desired bearing material and may be lubricated readily and easily. The friction members 28 are preferably made of light-weight heat insulating material normally containing a high percentage of asbestos or they may be made of other material from which brake shoes are normally constructed; and the filler ring 19 may be made of any desired material. The rubber gland 18 is a simple molded rubber part.

The friction shoes 25 and their relative location with respect to the other parts of the clutch serve the double function of transmitting the friction drive between the driving and driven members and of insulating the rubber gland 18 from the heat of friction developed during operation of the clutch. Also the hollow box like construction of the shoe supports 26—27 provides for insulating the rubber gland 18 from the heat developed at the clutch surface 45. Thus one of the improved clutches has been operated under such severe conditions that the drum wall 46 of the driven member reached and operated at a temperature above 500° F. without affecting the rubber gland in any way, even though the box-like support members 26 and 27 of the friction shoes 25 bear directly on the rubber gland 18.

The mounting of the driver bars 37 on the discs 13 not only transmits the driving torque of the driving member to the shoes 25 and maintains the shoes assembled on the driving member, but it also prevents the discs 13 from spreading sidewise under the pressure of the mercury within the driving member compartment when the clutch is rotated at a high speed. Thus, the mercury pressure is directed radially outward against the underside of the friction shoes 25.

The strength or tension of the springs 34 controls the delayed action or engagement of the clutch, after the driving member commences to rotate.

In assembling the clutch, the notched sleeve 6 is spot welded at 7 to the driving sleeve 1 and this is the only assembly operation requiring special though the simplest of equipment. Preferably the right hand disc 13 and its snap ring 14 are then mounted on the driving sleeve 1. A filler ring 19 is inserted in the rubber gland 18, and the clamping rings 15, spacer tube 16 and felt sleeve 17 are telescoped over the sleeve 6 in the position shown in Fig. 1. Mercury may then be introduced into the driving member compartment through the aperture 23. Left hand disc 13 and its snap ring 14 are then slipped over the end of driving sleeve 1 to tightly clamp and compress the legs 18a of the rubber gland 18 to form an air and liquid tight seal.

Each of the shoes 25 may be separately assembled. They are then placed around the periphery of the rubber gland 18 with springs 34 spanning the spaces between the shoes 25. Driver bars 37 then are inserted through holes 38 in discs 13 to secure the shoes 25 to the driving member.

The thrust washers 41 and bearing sleeve 42 are then slipped onto the driving sleeve 1, and the driven member housing 44 is telescoped over the parts. The cover plate 47 is then put in place and there held by the snap ring 48.

When it is necessary to repair or replace any of the clutch parts, the clutch may be disassembled very readily without any special tools by any mechanic by a reversal of the operations described in connection with the assembly of the improved clutch.

The stages of operation of the clutch are as follows: Figs. 1 and 2 illustrate the position of the parts when the clutch is at rest, the mercury level in inner chamber 20 being indicated at 24 in Fig. 2. When the driving member commences to rotate, the mercury forms an annular ring in the outer region of inner chamber 20 entirely around the periphery of the inner chamber 20 and commences to flow outward along the clearance passages 22 at both sides of the filler ring 19. This condition is illustrated in Fig. 11 where the mercury is indicated by solid black in the outer region of the inner chamber 20 and in clearance passages 22. Meanwhile, the clutch has not become engaged and there is no friction contact between the shoes 25 and the clutch surface 45 of the driven member 44.

As the driving member continues to rotate faster and faster, centrifugal force throws the mercury further outward and it flows through the clearance passages 22 and into the outer chamber 21 of the driving member compartment. The pressure of the mercury expands the rubber gland 18 and enlarges the outer chamber 21 radially. The mercury pressure is transmitted through the base of the U of the rubber gland 18 to the under surface of the supports 26—27 of the friction shoes 25. This pressure radially moves the shoes outward until the outer friction surface of the friction members 28 engage the inner friction surface 45 of the driven member housing 44. When this engagement occurs, the driven member is driven by the driving member and the parts are in the position shown in Fig. 3 where the mercury is also indicated by solid black in the expanded outer chamber 21, around the filler ring 19, and in the extreme outer region of the inner chamber 20.

In passing through the stages described, from a condition of the clutch at rest, to a condition of engagement, the mercury pressure must overcome the tension of springs 34. Therefore, the springs 34 act to cause delayed engagement of the clutch.

However, it is to be understood that in many instances, a delayed clutch engagement may not be desired, in which event the springs 34 may be omitted as illustrated in Figs. 12 and 13. In this modified construction upon omitting the springs 34, a key pin 53 is inserted under each driver bar 37 through the holes 38 in the discs 13 and the ends of the key pin 53 may be bent inward as indicated at 54. The key pins 53 therefor hold the driver bar grooves 39 interlocked with the disc 13 so as to prevent the discs from being spread sidewise by mercury pressure in the outer expansible chamber 21; and so that the driver bars 37 transmit driving torque to the shoes 25.

It is important in each form of construction illustrated, that the shoes 25 be positively rotated or driven by the driver bars 37 so as to prevent slippage between the under surface of the shoe supports 26—27 and the outer surface of the rubber gland 18, and so as to also prevent the driving torque from having to be transmitted to the shoes from the rubber gland 18. If either of these two conditions were present, the rubber gland 18 would be subject to circumferential twisting, tension and distortion which would ultimately cause injury to the rubber gland 18 and failure of the clutch.

Variations in temperature of the clutch when operating may cause expansion or contraction of the air in the driving member compartment. The parts are so constructed and arranged that the compartment breathes air without however permitting the escape of mercury. This is accomplished by making an imperfect fit between the ends of spacer sleeve 16 and the clamping rings 15 and between the inner flanges of clamping rings 15 and sleeve 6. The end of the spacer sleeve 16 may be notched if desired. Thus air may pass through these joints and the felt packing sleeve 17 whenever there is a change in pressure due to temperature variations.

Even though the driving member compartment may breathe air, the mercury is securely confined within the compartment due to the presence of the felt sleeve 17. Mercury will not pass through felt when the mercury is not under pressure. Thus when the clutch is at rest as shown in Figs. 1 and 2, and when mercury is in the bottom of the inner chamber 20 as best indicated in Figure 2, the felt sleeve effectively seals the mercury from leaking out of chamber 20. When the clutch is running and the mercury is under pressure, as in Figs. 3 and 11, and when heat may be developed which would expand the air within the driving member compartment, the mercury is always thrown outward away from any contact with the felt sleeve 17 or the imperfect joints between the ends of spacer sleeve 16 and clamping rings 15.

Only a relatively small amount of mercury is necessary for operating the clutch as indicated by reference to Figs. 1, 2, 3, and 11; and this amount of mercury is very small in proportion to the load carried or transmitted by the clutch. Thus the cost and weight of mercury used, and therefore the cost and weight of the clutch, is at a minimum. Even though a small amount of mercury is used, the mercury is effective in exerting great force against the friction shoes and this result is accomplished by the divided chambers of the driving member compartment.

The principle of operation may be well understood by referring to Fig. 14 wherein certain of the clutch parts are diagrammatically illustrated and the mercury is shown cross hatched, in a condition of clutch engagement. H represents the height of the mercury column, T the thickness of the mercury column in clearance passages 22, and A and B represent arbitrary points in the outer expansible chamber 21 at the inner surface of the rubber gland 18 and at the outer periphery of the annular ring mercury column within the chamber 21.

Under the laws of hydraulics, the pressure generated at the point A at any selected speed depends entirely upon the height H of the mercury column, irrespective of the thickness T of that column. The column extends along the clearance passage 22 from a mercury column level X in the outer region of the inner chamber 20 to a point of maximum pressure A in the outer expansible chamber 21. The same pressure present at point A is also present at point B where the mercury column has the same height H from the level X to point B.

This latter condition is based upon the principle of hydraulics that pressure at any point in a liquid is transmitted equally and undiminished to every other point in the liquid of equal head. Thus, the radial pressure developed against the inner surface of the base of the U of the rubber gland 18 which presses the shoes 25 outwardly does not depend upon the volume of mercury in the compartment but upon the head or height H of the mercury column. The total pressure exerted is the unit pressure at the point A or B times the outer circumferential area of the annular mercury ring in the outer expansible chamber 21.

As an example of the dimensions of the annular ring mercury column, the outer diameter of the mercury annulus may be of the order of 3½", the height H of the mercury column when the clutch is engaged may be approximately ½" more or less, the width of the mercury annulus in the outer chamber 21 may be variable depending upon the size of the clutch, and the thickness T of the mercury column which forms the head H may be approximately 1/64" or in the approximate range of from .010" to .015". Thus, the ratio of H to T may be as great as 50 to 1 with the result that only 1/50 of the amount of mercury is used to operate the improved clutch that would be used if the filler ring 19 were not present and the thickness T were equal to the head H. As just explained, the improved clutch in which the mercury head to thickness ratio is of the order of 50 to 1 produces the same unit pressure at the point A that would be produced with 50 times as much mercury occupying the space of the filler ring. The head to thickness ratio may be much greater than 50 to 1, say 100 to 1, depending upon the tolerances that may be maintained in manufacture.

Accordingly, the present invention provides an improved radial mercury actuated centrifugal clutch construction which overcomes the disadvantages and difficulties of prior art clutches; which confines the mercury in a tight compartment without rotary seals, separate from the housing wherein the friction shoes are accessibly located; in which dust formed from the friction elements may be carried away by the circulation of air through the driven member housing; in which heating incident to operation occurs at the outer clutch periphery where it may be readily dissipated; in which the bearings utilized in the clutch construction may be made of any suitable material and lubricated without contaminating the mercury with lubricant, and without injuring the bearing material with mercury; in which an expansible rubber gland is utilized, supported and held by filler means against injury by repeated expansion and contraction of the same during clutch operation; and which may be constructed with the simplest of parts by the simplest of operations and is durable, effective and reliable in use and relatively inexpensive to manufacture.

The embodiments of the present improvements illustrated and described herein are by way of example and the scope of the present invention is not limited to the exact details of construction of the various parts.

Finally, in the foregoing description certain terms have been used for brevity, clearness and understanding; but no unnecessary limitations are to be implied therefrom beyond the requirements of the prior art, because such words are utilized for descriptive purposes herein and not for the purpose of limitation, and are intended to be broadly construed.

Having now described the features of the invention, the construction, operation and use of preferred embodiments thereof, and the advantageous, new and useful results attained by the improved construction; the new and useful devices, constructions, arrangements, combinations, sub-combinations, parts and elements, and reasonable mechanical equivalents thereof obvious to those skilled in the art, are set forth in the appended claims.

I claim:

1. In a radial mercury actuated centrifugal clutch, a driving member including a radially expansible mercury containing compartment, radially movable friction shoes around said compartment rotatably associated with said member, means engaging the member and shoes for transmitting driving torque from the driving member to said shoes, a filler ring within said compartment dividing the compartment into an inner annular chamber and an outer expansible annular chamber with communication therebetween, and a driven member having an outer drum wall provided with a clutch surface on its interior, whereby mercury is thrown outward from the inner chamber to the expansible chamber upon rotation of the driving member to move the shoes radially outward into engagement with the driven member clutch surface.

2. In a radial mercury actuated centrifugal clutch, a driving member including disc means and clamping rings rotatably secured to the driving member, an annular U-shaped rubber gland clamped between said disc means and rings forming an expansible compartment in which mercury is contained, radially movable friction shoes mounted on the disc means about the outer periphery of the gland, means for transmitting driving torque from the driving member to said shoes, an annular filler ring within the compartment supporting the gland, and a driven member having an outer drum wall provided with a clutch surface on its interior, whereby mercury pressure in the expansible compartment upon rotation of the driving member moves the shoes radially outward into engagement with the driven member clutch surface.

3. In a radial mercury actuated centrifugal clutch, a driving member including a radially expansible mercury-containing compartment, radially movable friction shoes around said compartment rotatably associated with said member, a filler ring within said compartment dividing the compartment into an inner chamber and an outer expansible chamber with communication therebetween, and a driven member having a clutch surface radially outward of said shoes, whereby mercury is thrown outward from the inner chamber to the expansible chamber upon rotation of the driving member to move the shoes radially outward into engagement with the driven member clutch surface.

4. In a radial mercury actuated centrifugal clutch, a driving member including walls forming an inner chamber and an outer chamber with communicating passage means therebetween, the outer wall of said outer chamber being radially expansible, radially movable friction shoes associated with said member surrounding said expansible wall, means independent of said wall for transmitting driving torque from the member to said shoes, a driven member having an annular wall surrounding said shoes, and a quantity of mercury in the inner chamber, whereby rotation of the driving member throws the mercury outward to form an annular mercury column extending from the outer region of the inner chamber through said passage means and into the outer chamber to expand the expansible wall and press the shoes outward into driving engagement with the driven member.

5. In a radial mercury actuated centrifugal clutch, a driving member provided with a compartment having a radially expansible outer annular wall forming an outer annular chamber, said compartment also being provided with a second annular chamber spaced radially inward of said expansible chamber, restricted passage means communicating between said two chambers, shoes rotatably driven by said driving member independently of said expansible wall, and a driven member having a portion surrounding said shoes, whereby a small amount of mercury in said compartment upon rotation of the driving member forms an annular mercury column having an effective head extending through said passage means from said inner chamber to said outer chamber to expand said wall and press said shoes radially outward into driving member engagement with said driven member.

6. In a radial mercury actuated centrifugal clutch, a driving member including two axially spaced discs rotatably mounted on the driving member, two axially spaced clamping rings between said discs, a spacer sleeve extending between said clamping rings, a felt sleeve under said spacer sleeve, a U-shaped rubber gland having the legs of the U clamped and compressed between adjacent discs and clamping rings; said discs, rings, sleeves and gland forming a driving member compartment; a quantity of mercury in said compartment; and the joints between the discs and rings and the driving member, and between the spacer sleeve and rings permitting the passage of air; whereby the felt sleeve seals the mercury in liquid-tight manner within said compartment while permitting air in the compartment to breathe upon expansion or contraction thereof.

7. In a radial mercury actuated centrifugal clutch, a driving member including a driving sleeve, two axially spaced discs on said sleeve, snap ring means holding the discs assembled on said sleeve, interengaging means on the discs and sleeve for rotating the discs with the sleeve, two axially spaced clamping rings surrounding the sleeve between the discs, a U-shaped rubber gland having the legs of the U clamped between adjacent discs and clamping rings, and a spacer sleeve surrounding the driving member sleeve and extending between the clamping rings and reacting with the snap rings to space the discs and rings and clamp and compress the U-legs of the gland in liquid-tight sealing relation.

8. In a radial mercury actuated centrifugal clutch, a driven member housing having a drum-like wall provided with a clutch friction surface on its inner periphery, a driving member including a plurality of disc members mounted on and rotatable with the driving member, an annular rubber gland, U-shaped in cross section, with the U-legs clamped and compressed between certain of said disc members forming a closed compartment; a quantity of mercury in said compartment; means associated with said compartment dividing the compartment into an inner annular chamber and an outer annular chamber surrounding the inner annular chamber; the rubber gland forming an expansible outer wall for the outer annular chamber; means for sealing the mercury within said compartment in liquid-tight manner constructed and arranged to permit air to breathe into or out of the compartment; a plurality of arcuate friction shoes mounted upon and rotatable with the driving member; said shoes being radially movable relative to the driving member and being arranged about the expansible outer chamber wall; means for transmitting driving torque from the driving member to said shoes; and means for ventilating the interior of the driven member housing.

9. In a radial mercury actuated centrifugal clutch, a driving member including a U-shaped rubber gland and annular means clamping the U-legs of the gland to form a closed radially expansible mercury-tight compartment, a body of mercury in said compartment, radially movable friction shoes around said compartment rotatably associated with said member, means engaging the member and shoes for transmitting driving torque independent of the expansible compartment walls from the driving member to said shoes, and a driven member having an outer drum wall provided with a clutch surface on its interior, whereby mercury pressure in the expansible compartment developed by centrifugal force upon rotation of the driving member moves the shoes radially outward into engagement with the driven member clutch surface.

10. In a mercury actuated centrifugal clutch, a driving member including a U-shaped annular rubber gland mounted on the driving member, means clamping and compressing the U-legs of the gland to form a closed compartment, means within the gland preventing collapse of the gland while permitting expansion thereof, friction shoe segments separate from and actuated by the gland adapted to engage and drive a driven member upon expansion of the gland, a body of mercury within the gland, and means independent of the gland transmitting driving torque from the member to the friction shoe segments.

11. In a mercury actuated centrifugal clutch, a driving member including a U-shaped rubber gland and annular means clamping the U-legs of the gland to form a closed expansible mercury-tight compartment, a body of mercury in said compartment, movable friction shoe means adjacent said compartment rotatably associated with said member, means engaging the member and shoe means for transmitting driving torque independently of the expansible compartment walls from the driving member to said shoe means, and a driven member having a wall provided with a clutch surface, whereby mercury pressure in the expansible compartment developed by centrifugal force upon rotation of the driving member moves the shoe means into engagement with the driven member clutch surface.

12. In a mercury actuated centrifugal clutch, a driving member including disc means and clamping rings disposed between the disc means rotatably secured to the driving member, an annular U-shaped rubber gland clamped between said disc means and rings forming an expansible compartment, a body of mercury in said compartment, movable friction shoe means mounted on the disc means adjacent the gland, means for transmitting driving torque from the driving member to said shoe means, and a driven member having a wall provided with a clutch surface, whereby mercury pressure in the expansible compartment upon rotation of the driving member moves the shoe means into engagement with the driven member clutch surface.

13. In a mercury actuated centrifugal clutch, a driving member including walls forming an expansible mercury containing compartment, a body of mercury in said compartment, movable friction shoe segments associated with the compartment walls and said member, a filler ring within said compartment dividing the compartment into an inner chamber and an outer expansible chamber with communication therebetween, and a driven member having a clutch surface adjacent said shoe segments, whereby mercury is thrown outward from the inner chamber to the expansible chamber upon rotation of the driving member to move the shoes into engagement with the driven member clutch surface.

14. In a mercury actuated centrifugal clutch, a driving member including disc and clamping ring means rotatable with the driving member, spacer means extending between said disc and clamping ring means, a felt sleeve under said spacer means, a U-shaped rubber gland having the legs of the U clamped and compressed by said disc and clamping ring means; said disc, ring and spacer means and said gland forming a driving member compartment; a body of mercury in said compartment; and the joints between the disc, ring and spacer means permitting the passage of air; whereby the felt sleeve seals the mercury in liquid-tight manner within said compartment while permitting air in the compartment to breathe upon expansion or contraction thereof.

15. In a mercury actuated centrifugal clutch, a driving member including a driving sleeve, two axially spaced discs on said sleeve, means connecting the discs and sleeve for rotating the discs with the sleeve, two axially spaced clamping rings surrounding the sleeve between the discs, a U-shaped rubber gland having the legs of the U clamped between adjacent discs and clamping rings, and a spacer sleeve surrounding the driving member sleeve and extending between the clamping rings and reacting with the means connecting the disc and driving member sleeve to space the discs and rings and clamp and compress the U-legs of the gland, in liquid-tight sealing relation.

16. In a mercury actuated centrifugal clutch, a driving member, an annular U-shaped rubber gland associated with the driving member, annular ring means clamping the U-legs of the gland to form an expansible mercury-tight compartment, a body of mercury in said compartment, movable friction shoe means adjacent the gland, disc means mounted on the driving member and mounting the shoe means for transmitting driving torque from the driving member to said shoe means, an annular filler ring within the compartment supporting the gland, and a driven member having a wall provided with a clutch surface, whereby mercury pressure in the expansible compartment upon rotation of the driving member moves the shoe means into engagement with the driven member clutch surface.

17. In a mercury actuated centrifugal clutch, a driving member including a U-shaped annular rubber gland mounted for rotation with the driving member, gland sealing means including a felt sealing ring clamping the U-legs of the gland to form an expansible annular mercury-tight compartment, a body of mercury within the compartment, friction shoe means separate from and actuated by the gland adapted to engage and drive a driven member upon expansion of the gland, and means independent of the gland transmitting driving torque from the member to the friction shoe means.

18. In a mercury actuated centrifugal clutch, a driving member including a driving sleeve, two axially spaced discs on the sleeve, means connecting the discs and sleeve for rotating the discs with the sleeve, a U-shaped rubber gland between the discs, means clamping the U-legs of the gland between the discs to form an annular mercury-tight compartment within the gland, a body of mercury in said compartment, friction shoe means separate from and actuated by the gland adapted to engage and drive a driven member upon the expansion of the gland, and means transmitting driving torque from the discs to the friction shoe means.

19. In a mercury actuated centrifugal clutch, a driving member including walls forming an expansible mercury-tight compartment, a body of mercury in said compartment, movable friction shoe means adjacent said compartment rotatably associated with said member, a driven member engageable by said friction shoe means, said walls at rest forming an inner annular mercury containing chamber, and said walls when expanded by the pressure of mercury thrown outward by centrifugal force upon rotation of the driving member forming an outer annular chamber communicating with the inner annular chamber containing an annular mercury column having a head to thickness ratio of about 50 to 1 and greater, whereby the friction shoe means are pressed into driving engagement with the driven member.

20. In a mercury actuated centrifugal clutch, a driving member including a U-shaped rubber gland and annular means clamping the U-legs of the gland to form a closed expansible mercury-tight compartment, a body of mercury in said compartment, movable friction shoe means adjacent said compartment rotatably associated with said member, a driven member engageable by said friction shoe means, said gland at rest forming an inner annular mercury containing chamber, and said gland when expanded by the pressure of mercury thrown outward by centrifugal force upon rotation of the driving member forming an annular chamber communicating with the inner annular chamber containing an annular mercury column having a head to thickness ratio of about 50 to 1 and greater, whereby the friction shoe means are pressed into driving engagement with the driven member.

HANS J. ZIMMERMANN.